US012117776B2

(12) United States Patent
Hayek et al.

(10) Patent No.: US 12,117,776 B2
(45) Date of Patent: Oct. 15, 2024

(54) DIVING WATCH

(71) Applicant: Blancpain SA, Le Brassus (CH)

(72) Inventors: Marc A. Hayek, Cully (CH); Laurent Ballesta, Mauguio (FR)

(73) Assignee: Blancpain SA, Le Brassus (CH)

( * ) Notice: Subject to any disclaimer, the term of this patent is extended or adjusted under 35 U.S.C. 154(b) by 400 days.

(21) Appl. No.: 17/621,006

(22) PCT Filed: May 25, 2020

(86) PCT No.: PCT/EP2020/064449
§ 371 (c)(1),
(2) Date: Dec. 20, 2021

(87) PCT Pub. No.: WO2020/259936
PCT Pub. Date: Dec. 30, 2020

(65) Prior Publication Data

US 2022/0365488 A1 Nov. 17, 2022

(30) Foreign Application Priority Data

Jun. 28, 2019 (EP) .................................... 19183410

(51) Int. Cl.

| | |
|---|---|
| ***G04B 47/06*** | (2006.01) |
| ***G04B 19/28*** | (2006.01) |
| ***G04B 37/08*** | (2006.01) |

(52) U.S. Cl.
CPC ......... *G04B 47/061* (2013.01); *G04B 19/283* (2013.01); *G04B 37/08* (2013.01)

(58) Field of Classification Search
CPC . G04C 9/02; G04C 1/08; G04C 10/00; G04G 17/04; G04R 20/08; G04R 60/10; G04R 60/14
See application file for complete search history.

(56) References Cited

U.S. PATENT DOCUMENTS 3,124,928 A * 3/1964 Brunet ................ G04B 47/061 235/78 R
3,475,902 A 11/1969 Wessel
(Continued)

FOREIGN PATENT DOCUMENTS

CH 394 658 A 6/1965
CH 698 906 A2 11/2009
(Continued)

OTHER PUBLICATIONS

International Search Report issued Jul. 24, 2020 in PCT/EP2020/064449, filed on May 25, 2020, 2 pages.
(Continued)

*Primary Examiner* — Edwin A. Leon
(74) *Attorney, Agent, or Firm* — Oblon, McClelland, Maier & Neustadt, L.L.P.

(57) ABSTRACT

A diving watch includes a first device for displaying the current time and a second device for analogically displaying a diving duration. The second device includes a hand dedicated to the indication of a diving duration and a rotating bezel provided with a visible face including a time scale including time graduations. The bezel cooperates with the dedicated hand, in particular continuously animated with a uniform rotational movement, by displaying an instant value of the diving duration.

20 Claims, 6 Drawing Sheets

(56) References Cited

U.S. PATENT DOCUMENTS

| | | | | |
|---|---|---|---|---|
| 3,505,808 A | 4/1970 | Eschle | | |
| 3,596,463 A * | 8/1971 | Rudolph | G04B 19/283 368/266 | |
| 3,696,610 A * | 10/1972 | Charbonnier | G04B 47/061 116/293 | |
| 7,215,603 B2 * | 5/2007 | Koike | G04F 8/00 368/225 | |

FOREIGN PATENT DOCUMENTS

| | | |
|---|---|---|
| CN | 101432668 A | 5/2009 |
| FR | 1 285 895 A | 2/1962 |
| FR | 1 572 837 A | 6/1969 |
| JP | 46-21507 | 7/1971 |
| JP | 47-27962 | 8/1972 |
| JP | 2017-58231 | 3/2017 |

OTHER PUBLICATIONS

Combined Chinese Office Action and Search Report issued Oct. 8, 2022, in corresponding Chinese Patent Application No. 202080047118.3 (with English Translation and English Translation of Category of Cited Documents), 13 pages.

Office Action issued Jan. 30, 2024, in corresponding Korean Patent Application No. 10-2021-7040789 (with English Translation), 8 pages.

Office Action issued Dec. 13, 2022, in corresponding Japanese Patent Application No. 2021-574246 (with English Translation), 9 pages.

* cited by examiner

DIVING WATCH

TECHNICAL FIELD

The invention relates to a diving watch allowing a diver to be given an indication of the instant value of his diving time.

TECHNOLOGICAL BACKGROUND

Different parameters must be known to a diver when he performs an underwater dive in order to guarantee his safety. In particular, the diver must be able to instantly know his diving time so as not to exhaust his oxygen reserves and be able to return to the surface safely.

Watches which provide a diver with information relating to his diving time are already known. However, such watches do not allow directly establishing, that is to say without making a mental calculation or else a reasoning by the diver from visible duration data on these watches, the diving time when it is more than one hour.

There is therefore a need in the prior art for a watch indicating directly to the diver the diving time regardless of the duration of this dive.

SUMMARY OF THE INVENTION

One of the purposes of the invention is to improve the safety of the diver during a dive by facilitating the latter's knowledge of information relating to the duration of this dive.

The object of the present invention is to respond to this request by providing a diving watch including a first device for displaying the current time and a second device for analogically displaying a diving duration, said second device comprising a hand dedicated to the indication of a diving duration and a rotating bezel provided with a visible face including a time scale including time graduations, said bezel being configured to cooperate with said dedicated hand in particular continuously animated with a uniform rotational movement, by displaying an instant value of the diving duration.

Thanks to these features, the present invention provides a diving watch which provides the diver with indications relating to the diving time, by seeing at a glance, the hand dedicated to the indication of a diving duration designating a time graduation of the time scale comprised on the visible face of the rotating bezel. In doing so, the diver is thus guaranteed to perform this dive in optimal conditions being able to focus his attention and concentration on the management of his oxygen consumption or else, if necessary, being able to perform decompression stops, which improves his safety. Indeed, the simple reading of the diving duration no longer requiring to perform tedious calculations thus allows the diver to release some of the stress related to this diving duration. In addition, he can then shift his concentration and attention to other aspects of diving that are sensitive and valuable for his survival, because he is rightly reassured about the reliability of the information relating to the diving duration.

In other embodiments:

said dedicated hand indicates the hour and minutes relating to the duration of the dive;

the time scale defines a time interval strictly greater than one hour;

the visible face of the rotating bezel comprises an index for positioning said bezel relative to the dedicated hand;

the rotating bezel is mounted movable in unidirectional rotation on a middle part of a waterproof case of said watch;

the watch comprises a device for blocking the positioning of the bezel relative to the dedicated hand;

the dedicated hand has a shape or a colour distinguishing it from the hands of the first display device;

the time graduations of the time scale and all or part of a visible face of the dedicated hand have a similar colour;

the time graduations of the time scale and all or part of a visible face of the dedicated hand have a similar colour which is different from that of another part of a waterproof case of the watch, in particular the dial, an index comprised in/on the dial or else a hand of the first display device;

the time graduations of the time scale and all or part of a visible face of the dedicated hand comprise a luminescent material having the property of emitting light in a similar colour;

the time graduations of the time scale and all or part of a visible face of the dedicated hand comprise a luminescent material having the property of emitting light in a similar colour which is different from that of a luminescent material comprised in another part of a waterproof case of the watch, in particular the dial, an index comprised in/on the dial or else a hand of the first display device;

the first display device is an analogue or digital display device;

the watch is mechanical or electromechanical;

the first and second devices are two distinct display devices;

the dedicated hand has an angular speed which is different from that of each of the other hands of this watch, and when the first display device is analogue, the dedicated hand and all the hands of this first device are coaxial.

BRIEF DESCRIPTION OF THE FIGURES

The invention will be described below in more detail using the appended drawings, given by way of non-limiting examples, wherein.

DETAILED DESCRIPTION OF THE INVENTION

Figure 1A:
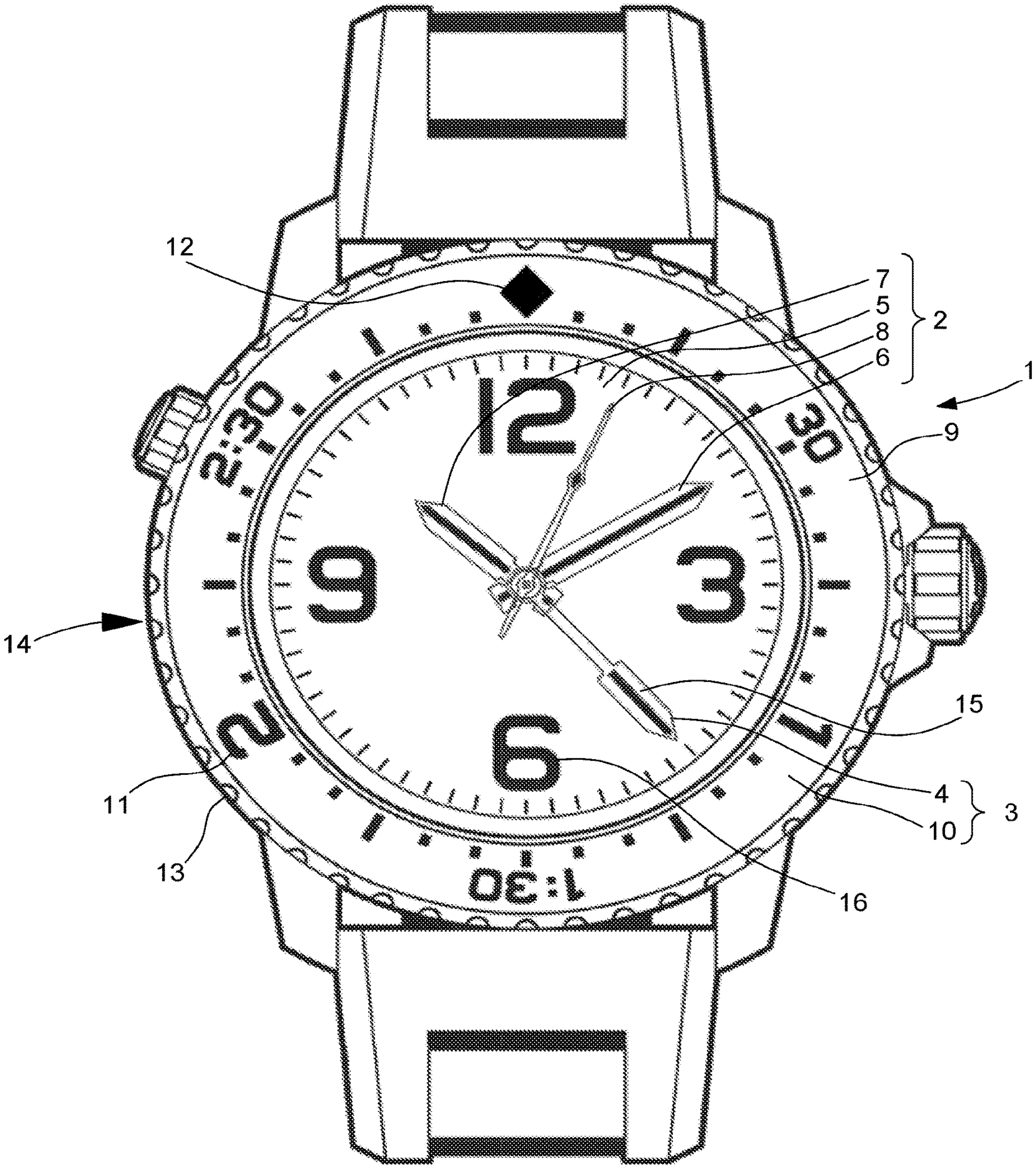
FIGS. 1*a* to 1*c* show a perspective view of a diving watch analogically displaying different instant values of a diving duration, according to one embodiment of the invention.
Figure 1B:
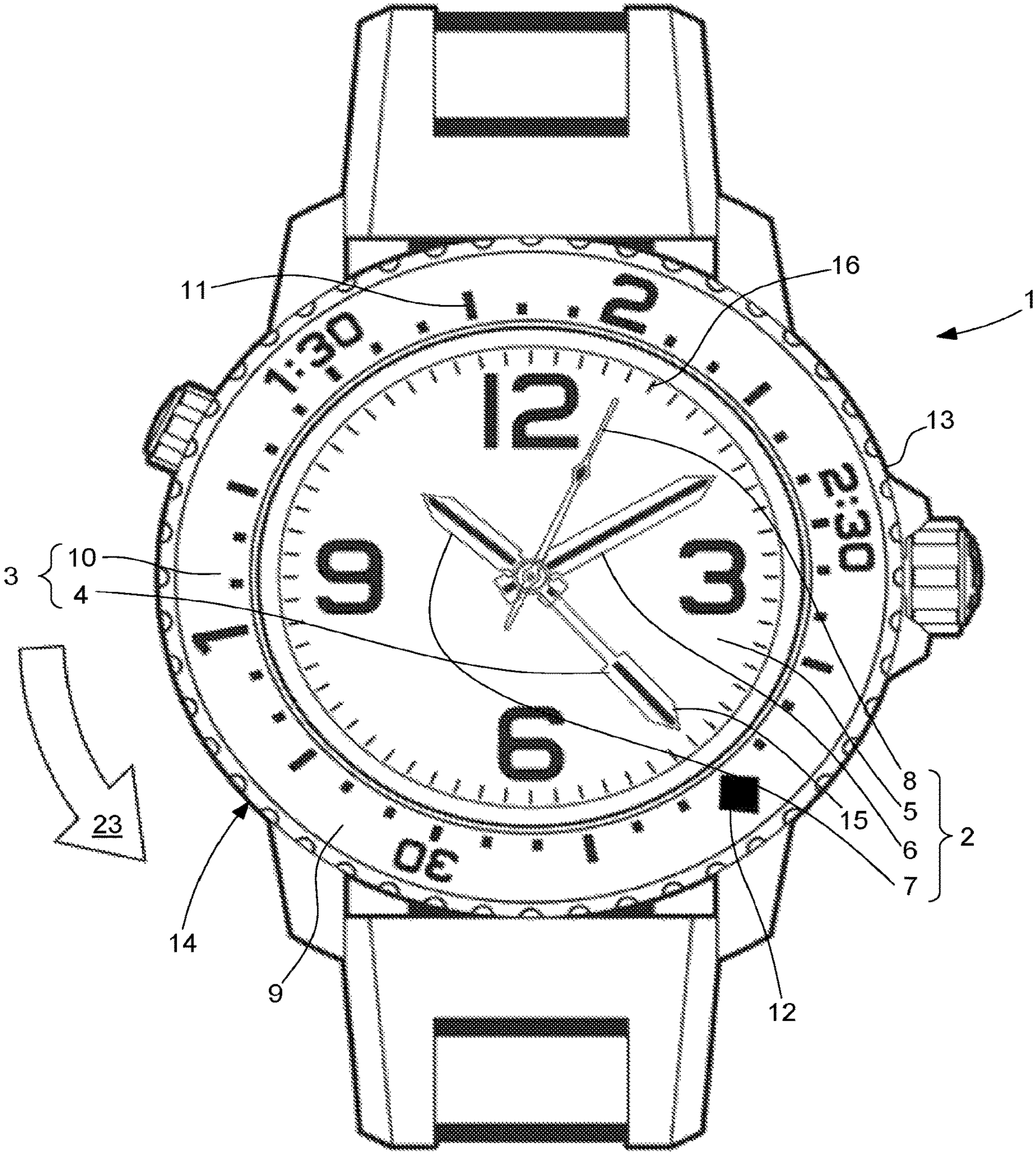
Figure 2:
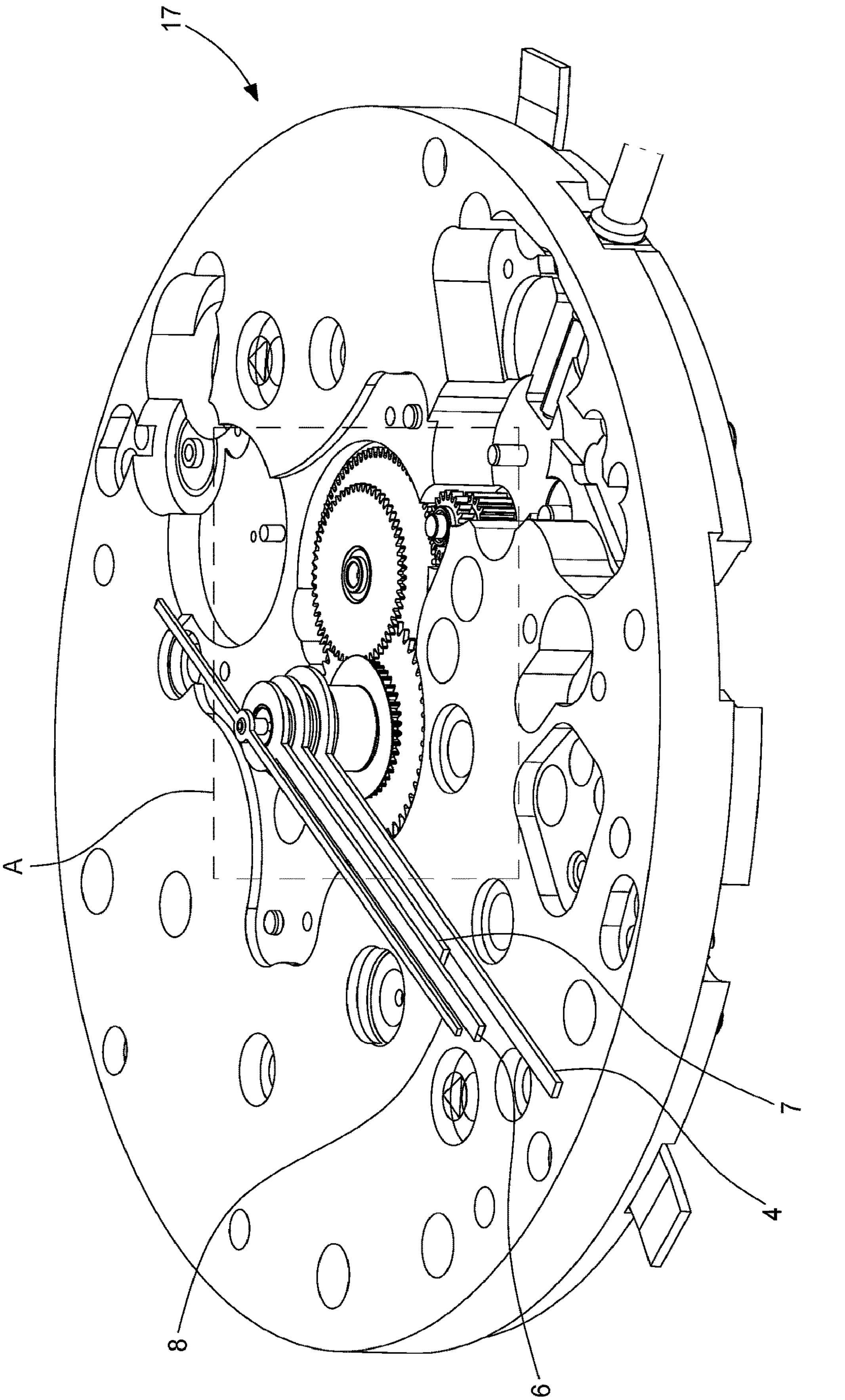
FIG. 2 shows a perspective view of a movement of this watch, according to the embodiment of the invention.

The present invention proceeds from the original idea which consists in equipping a diving watch 1 with a device 3 for analogically displaying a diving duration allowing the diver to realise at a glance the time elapsed from the dive he is performing and, if necessary, to return to the surface or to continue this dive depending for example on the state of his oxygen reserves. The diving watch 1 according to the invention therefore allows increasing the safety of the diver. FIGS. 1*a* to 1*b* are perspective views of a diving watch 1 according to an embodiment of the invention. Designated as a whole by the general reference numeral 1, this watch 1 is of the conventional type and can be a mechanical or electromechanical watch. It includes a waterproof case 14 which can for example be of the metallic type comprising a middle part 13 wherein a base is screwed or held by friction. The case 14 includes horns provided for attaching a bracelet and in particular contains a horological movement 17 visible in FIG. 2 as well as a dial 5. Such a dial 5 has hour graduations 16 on its outer circumference such as hour appliques and/or indexes, conventionally representing hours and minutes. This case 14 is closed on its upper face by a crystal, carrying a bezel 10 that is rotating/turning on its periphery, the bezel 10 being mounted movable in rotation relative to the middle part 13. This rotation of the bezel 10 is preferably achievable unidirectionally in the counterclockwise direction 23. Conventionally, external control organs are provided in the shape, for example, of a crown and/or at least one lateral push-piece.

This watch 1 includes a first device 2 for displaying the current time. This display device 2 can be analogue or digital. In the present embodiment, this display device 2 is preferably analogue and is formed by the dial 5 and a hand-fitting including an hour hand 7, a minute hand 6 and a second hand 8. These hands 6, 7, 8 are each conventionally mounted at one of their ends on a corresponding rotation shaft disposed at the centre of the dial 5 in order to displace above this dial 5. It will be noted that the hour graduations 16 and all or part of a visible face of these hands 6, 7, 8 may have a similar colour. In addition, the hour graduations 16 and all or part of a visible face of these hands 6, 7, 8 may comprise a luminescent material having the property of emitting light of similar colour when immersed in the dark. This material can be a material known under the brands of "LumiNova®" or "Super-LumiNova®". Note that the "Super-LumiNova®" material thus designates a photoluminescent material with phosphorescent properties. In the dark, this material restores the light stored in the form, for example, of a blue, green or else red glow. This material is applied on these hands 6, 7, 8 and the hour graduations 16. Such material gradually loses its phosphorescence in the dark, but is automatically recharged under the light.

This watch 1 also comprises a second display device 3 which is necessarily an analogue display device. This second device 3 comprises the rotating bezel 10 and a dedicated hand 4 for indicating the duration of the dive. This dedicated hand 4, otherwise called "diving duration hand" or "diving duration indication hand" or "diving duration determination hand" or else "hand indicating a single item of information relating to the diving duration", is animated:

- continuously with a uniform and/or continuous rotational movement, or
- continuously with a uniform and/or continuous circular movement, or
- with a uniform and/or continuous permanent rotational movement, or
- with a uniform and/or continuous permanent circular movement.

Figure 1C:
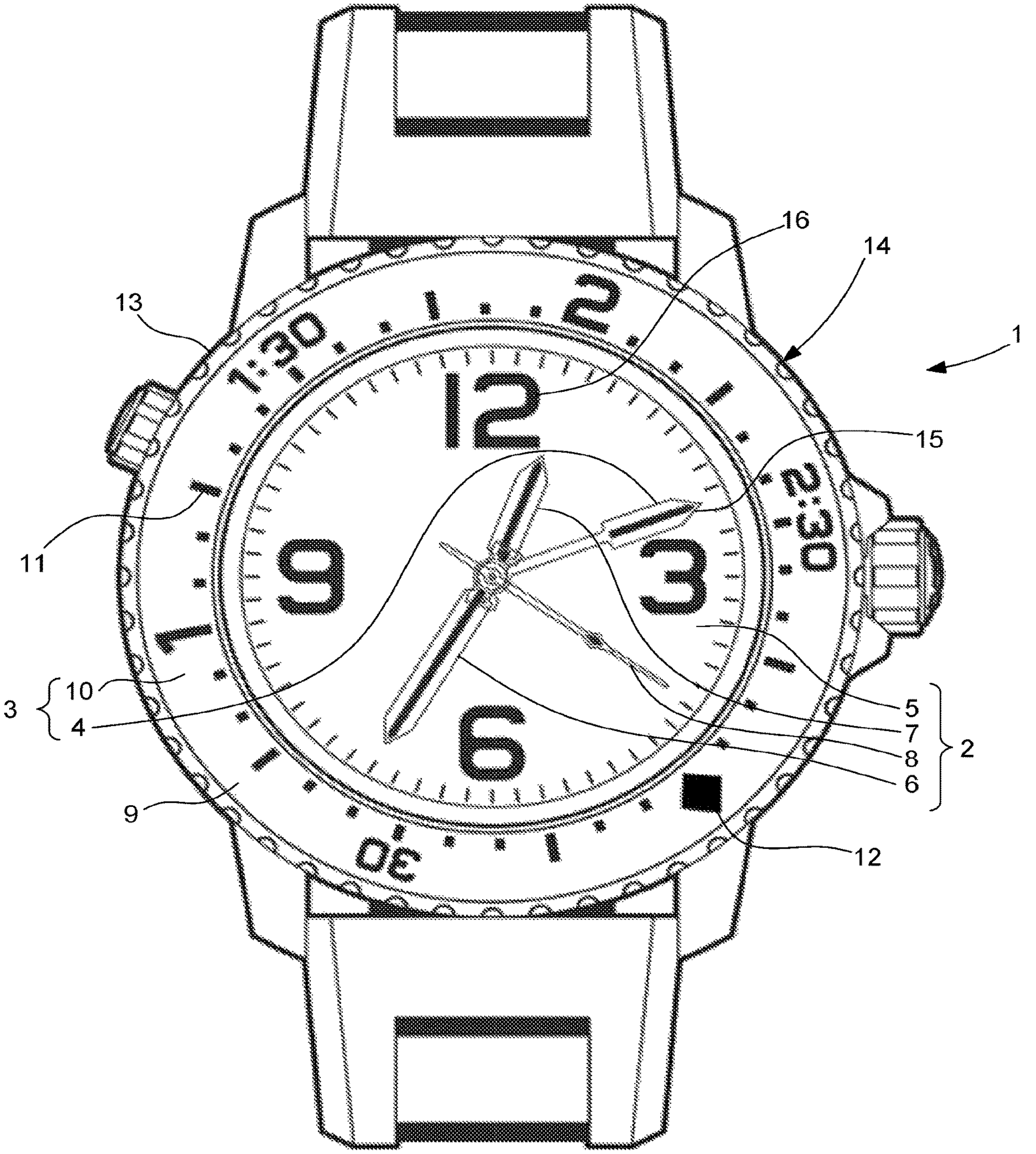

This rotational movement is performed in the clockwise direction. It will be noted that the movement of this hand cannot be controlled for example by a button of the watch, this movement is permanent like that of the hour and minute hands 7, 6 of this watch. In other words, this dedicated hand 4 operates without interruption as long as the watch has energy to ensure the operation of the movement of this watch. This hand 4 is qualified as a "dedicated" hand because it is intended only and specifically for establishing information relating to the diving duration, therefore it does not participate in performing any other function of the watch 1. This dedicated hand 4 is mounted at one of its ends on a corresponding rotation shaft arranged at the centre of the dial 5, particularly at the centre of the bezel 10. The bezel 10 comprises a visible face 9 on which is plotted a time scale 11, including time graduations, and defining a time interval strictly greater than one hour. It will be noted that the time graduations include an index 12 for positioning said bezel 10 relative to the dedicated hand 4, this index 12 defining the beginning and the end of this time scale 11. In the example shown in FIGS. 1*a* to 1*c*, the time interval is three hours and this time scale 11 is then graduated every five minutes. It is understood that in other variants this time interval could be, in a non-limiting and non-exhaustive manner, of two, four, five or even six hours. In this configuration, the dedicated hand 4 cooperates with the time scale 11 to give the diver an instant indication of the duration of the dive already completed/elapsed. In other words, the bezel 10, comprising this time scale 11, is configured to cooperate with this dedicated hand 4 for analogically displaying an instant value of the diving duration or an immediate value without relative calculation of the duration of the dive. This value can therefore be instantaneous, immediate or else a reading value on the bezel of the duration of the dive. It is understood that the dedicated hand 4 cooperating with the graduated bezel 10 is able to indicate an instantaneous value of the duration of a dive, that is to say a visual identification of the diving time registered on the graduation of the time scale of the bezel and designated by the end of this dedicated hand 4. This dedicated hand 4 does not cooperate with the bezel 10 to indicate a time remaining to the diver before performing a decompression stop as is often the case in the prior art. In this context, the dedicated hand 4 indicates a time graduation of the time scale 11, a graduation which comprises the hour and the minutes relating to the duration of the dive. In addition, it is understood that in this configuration where the time interval is three hours, the end of the dedicated hand 4 must, in order to traverse this time scale 11 starting from the positioning index 12 until reaching this same index 12, describe an angle of 360 degrees.

In this second display device 3, the dedicated hand 4 has a shape or a colour which aims at distinguishing it from the hand-fitting of the first display device 2, namely the hour, minute and second hands. In addition, the time graduations of the time scale 11 and all or part of a visible face 15 of the dedicated hand 4 have:

- a similar colour, or
- a similar colour which is different from that of another part of the waterproof case 14 of the watch 1 in particular the dial 5, a time scale 16 comprised in/on the dial 5 or else a hand 6, 7, 8 of the first display device 2.

In addition, the time graduations and all or part of the visible face 15 of the dedicated hand 4 comprise a luminescent material having the property of emitting light in:

- a similar colour, or
- a similar colour which is different from that of a luminescent material comprised in another part of the waterproof case 14 of the watch 1, in particular the dial 5, an hour graduation 16 comprised in/on the dial 5 or else a hand 6, 7, 8 of the first display device 2.

It will be noted that, as in the first device 2, the time graduations and the dedicated hand 4 comprise a luminescent material having the property of emitting, once they have been plunged into darkness, a light of similar colour. This material may correspond to a material known under the brands of "LumiNova®" or "Super-LumiNova®".

These first and second devices 2, 3 are two separate distinct devices 2, 3 because they contribute in transmitting to the diver two different information items, one on the current time and the other on the duration of a dive, from different components of the watch 1, the hand-fitting and the dial 5 for the first device 2 and the dedicated hand 4 and the bezel 10 for the second device 3. Note that when the first display device 2 is analogue, the dedicated hand 4 and all the hands 6, 7, 8 of this first device 3 are coaxial with each other. In other words, the dedicated hand 4, the hour hand 7, the minute hand 6 and the second hand 8 are coaxial. All these hands 4, 6, 7, 8 of the watch are mounted in the latter while being coaxial with each other.

Figure 3:
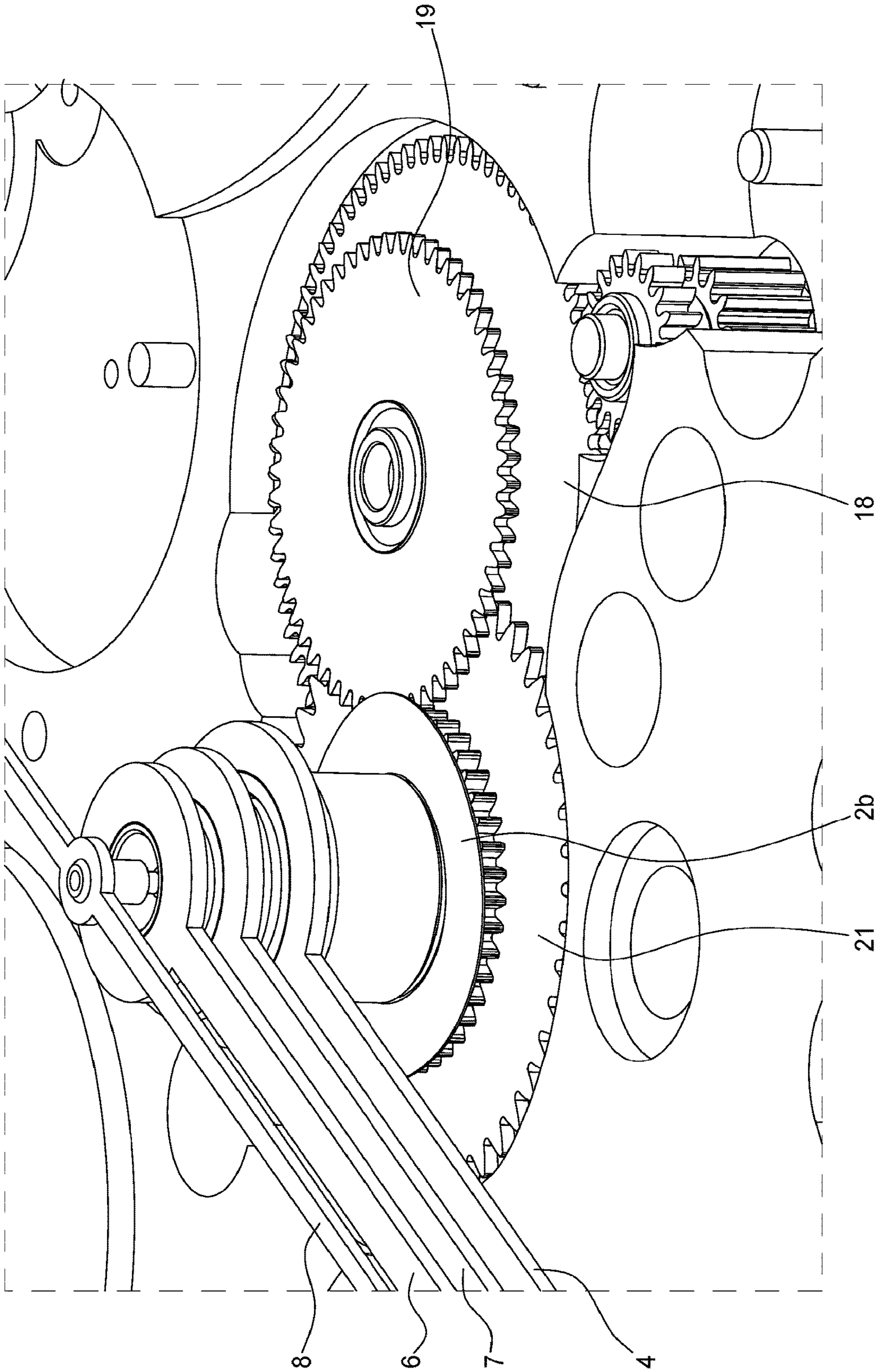
FIG. 3 is a view, on a larger scale, of a part A of FIG. 2.
Figure 4:
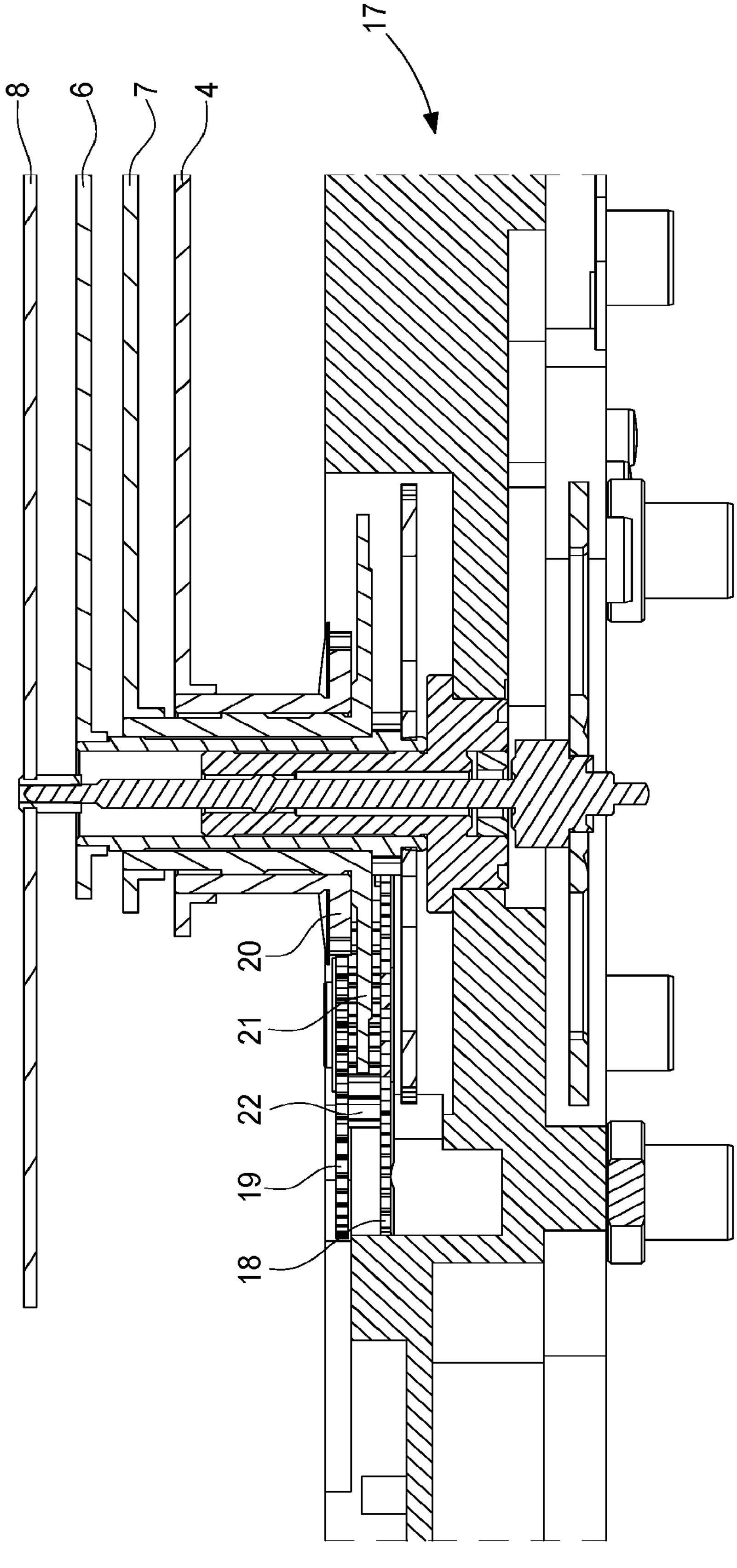
FIG. 4 is an axial sectional view of the movement, according to the embodiment of the invention.

This dedicated hand 4 has an angular speed which is different from that of all the other hands of this watch. This dedicated hand 4 has an angular speed which is different from that of each of the other hands 6, 7, 8 of this watch 1. This dedicated hand 4 has a constant angular speed which is comprised between the angular speeds of the hour and the minute hands 7, 6 of the watch. This dedicated hand 4 has an angular speed which is greater than the angular speed of the minute hand 6. This dedicated hand 4 has an angular speed which is less than the angular speed of the hour hand 7. Note that the angular speeds of these hands referenced 4, 6 and 7 are constant. In this embodiment where the time interval is three hours, the dedicated hand 4 displaces three times faster than the minute hand 6 of the first device 2 and four times slower than the hour hand 7. In this context, the movement 17 illustrated in FIGS. 2 to 4 comprises a first toothed wheel 20 capable of executing a complete rotation according to the time interval of the time scale 11 defined on the bezel 10 and which is here of three hours. This first toothed wheel 20 which is arranged in this movement 17 above an hour wheel 21, is comprised on a rotation shaft on which the dedicated hand 4 is fastened by driving. This first toothed wheel 20 meshes a second toothed wheel 19 mounted on a shaft fastened to a minute wheel 18 of the movement 17. It will be noted that the hour wheel 21 meshes a pinion 22 comprised on the shaft of the minute wheel 18.

The watch 1 also comprises a device for blocking the positioning of the bezel 10 relative to the dedicated hand 4. Such a blocking device is of a design known from the state of the art and it is therefore not necessary to further describe it here. It will be noted that this blocking device is intended to prevent an uncontrolled rotation of the bezel 10, which would risk distorting the information relating to the diving duration resulting from the cooperation between the dedicated hand 4 and the bezel 10.

In one embodiment, this diving watch 1 includes the first device 2 for displaying the current time and the second analogue device 3 for displaying the diving duration, said second device 3 comprising the diving duration hand 4 animated with a uniform permanent circular movement as well as the rotating bezel 10 provided with the visible face 9 including the time scale 11 including the time graduations, said bezel 10 being configured to cooperate with said dedicated hand 4 by displaying an instantaneous/immediate value of the diving duration.

In another embodiment, this diving watch 1 includes the first analogue device 2 for displaying the current time and the second analogue device 3 for displaying the diving duration, said second device 3 comprising the diving duration hand 4 animated with a uniform permanent circular movement as well as the rotating bezel 10 provided with the visible face 9 including the time scale 11 including the time graduations, said bezel 10 being configured to cooperate with said dedicated hand 4 by displaying an instantaneous/immediate value of the duration of the dive, said dedicated hand 4 and all the hands 6, 7, 8 of the first device 3 being coaxial.

The invention also relates to a method for estimating a diving duration from this watch 1. For this purpose, when the diver begins his dive, the method then comprises a step of arranging the positioning index 12 comprised on the bezel 10 opposite the end of the dedicated hand 4 as can be seen in FIG. 1*b*. During this step, the bezel 10, the index 12 of which is initially positioned on the hour graduation relating to the number twelve for twelve hours in an example illustrated in FIG. 1*a*, is then actuated so as to perform a rotation in the counterclockwise direction 23 until this index 12 is positioned opposite the dedicated hand 4.

Thereafter, this method provides a step of determining the diving duration. During this step, as soon as the diver wishes to have the instant value of the duration of this dive, it is appropriate to visually identify the graduation of the time scale 11 indicated by the end of the dedicated hand 4. For example, in FIG. 1*c*, this instant value corresponds to a diving duration of two hours twenty-five.

Thus, the invention allows providing the diver with indications relating to the diving time, by seeing at a glance, the designation by the dedicated hand 4 of a time graduation of the time scale 11 comprised on the visible face 9 of the rotating bezel 10.

The invention claimed is:

1. A diving watch, comprising:

a first device to display the current time, including an hour hand and a minute hand; and a second device to analogically display a diving duration, said second device comprising a hand dedicated to an indication of the diving duration and a rotating bezel provided with a visible face including a time scale including time graduations, said bezel being configured to cooperate with said dedicated hand by displaying an instant value of the diving duration, wherein the dedicated hand has an angular speed which is less than an angular speed of the minute hand and greater than an angular speed of the hour hand.

2. The diving watch according to claim 1, wherein said dedicated hand is continuously animated with a uniform rotational movement.

3. The diving watch according to claim 1, wherein said dedicated hand indicates an hour and minutes relating to the duration of the dive.

4. The diving watch according to claim 1, wherein the time scale defines a time interval strictly greater than one hour.

5. The diving watch according to claim 1, wherein the visible face of the rotating bezel comprises an index for positioning said bezel relative to the dedicated hand.

6. The diving watch according to claim 1, wherein the rotating bezel is mounted movable in unidirectional rotation on a middle part of a waterproof case of said watch.

7. The diving watch according to claim 1, further comprising a device to block the positioning of the bezel relative to the dedicated hand.

8. The diving watch according to claim 1, wherein the dedicated hand has a shape or a colour distinguishing it from the hour and minute hands of the first display device.

9. The diving watch according to claim 1, wherein the time graduations of the time scale and all or part of a visible face of the dedicated hand comprise:

a colour which is different from that of another part of a waterproof case of the watch.

10. The diving watch according to claim 9, wherein the another part is a dial, an index comprised in/on the dial, or the hour hand or the minute hand of the first display device.

11. The diving watch according to claim 1, wherein the time graduations of the time scale and all or part of a visible face of the dedicated hand comprise a luminescent material that emits light in:

a colour which is different from that of a luminescent material comprised in another part of a waterproof case of the watch.

12. The diving watch according to claim 11, wherein the another part is a dial, an index comprised in/on the dial, or the hour hand or the minute hand of the first display device.

13. The diving watch according to claim 1, wherein the first display device is an analogue or digital display device.

14. The diving watch according to claim 1, wherein the diving watch is a mechanical or electromechanical watch.

15. The diving watch according to claim 1, wherein the first and second devices are two distinct display devices.

16. The diving watch according to claim 1, wherein when the first display device is analogue, the dedicated hand, the hour hand, and the minute hand are coaxial.

17. The diving watch according to claim 1, wherein the dedicated hand cannot be controlled by any button of the watch.

18. The diving watch according to claim 1, wherein the dedicated hand is configured to rotate without interruption as long as the watch has energy to ensure operation of a movement of the watch.

19. The diving watch according to claim 1, wherein the time scale of the rotating bezel is two, three, four, five, or six hours.

20. The diving watch according to claim 1, wherein the dedicated hand does not cooperate with the bezel to indicate a time remaining before a decompression stop.

* * * * *